May 15, 1962
C. D. MacCRACKEN ETAL  3,034,414
METHODS AND APPARATUS FOR SUPPLYING CONDITIONED
AIR TO THE INTERIORS OF AUTOMOBILES
PARKED AT DRIVE-IN THEATERS
Filed Nov. 5, 1958
4 Sheets-Sheet 1
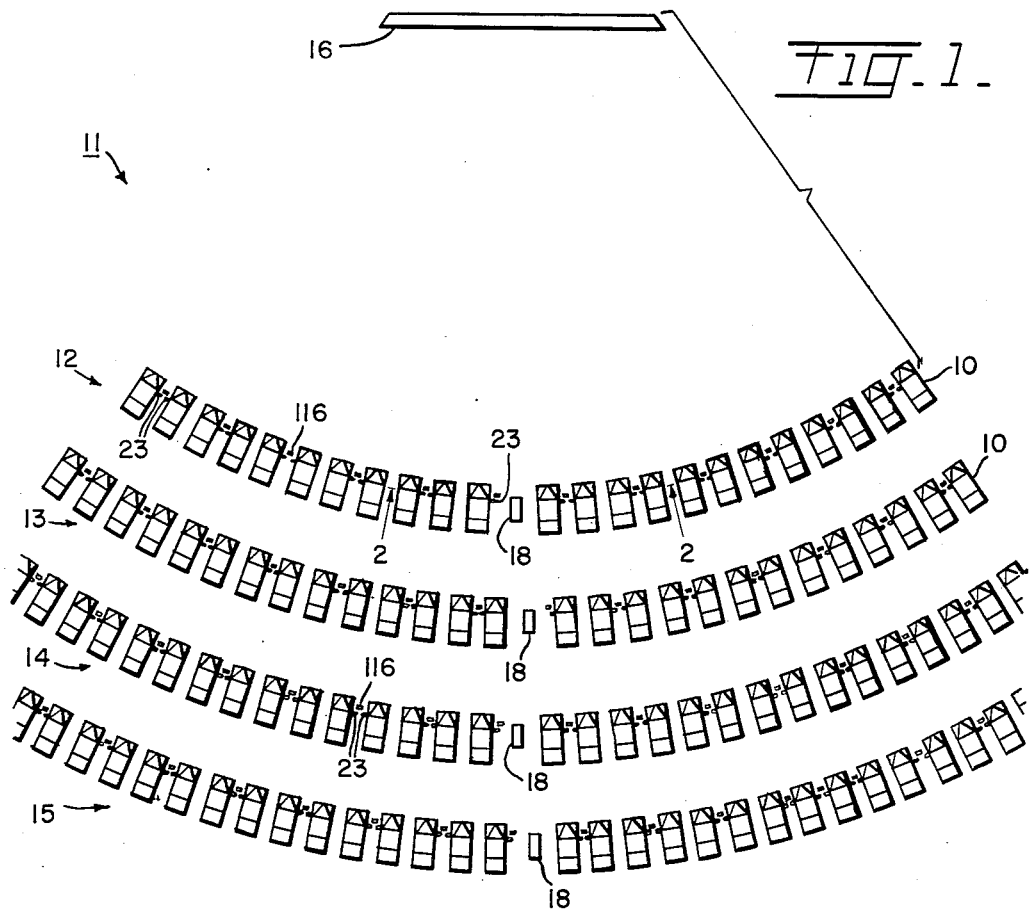
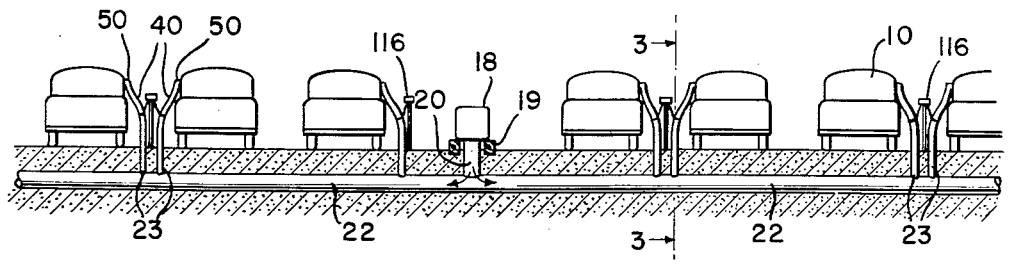
INVENTORS
CALVIN D. MacCRACKEN
JOHN J. RIOUX
GEORGE N. MILES
WILLIAM T. HOFFMAN
BY James M. Relph
ATTORNEY

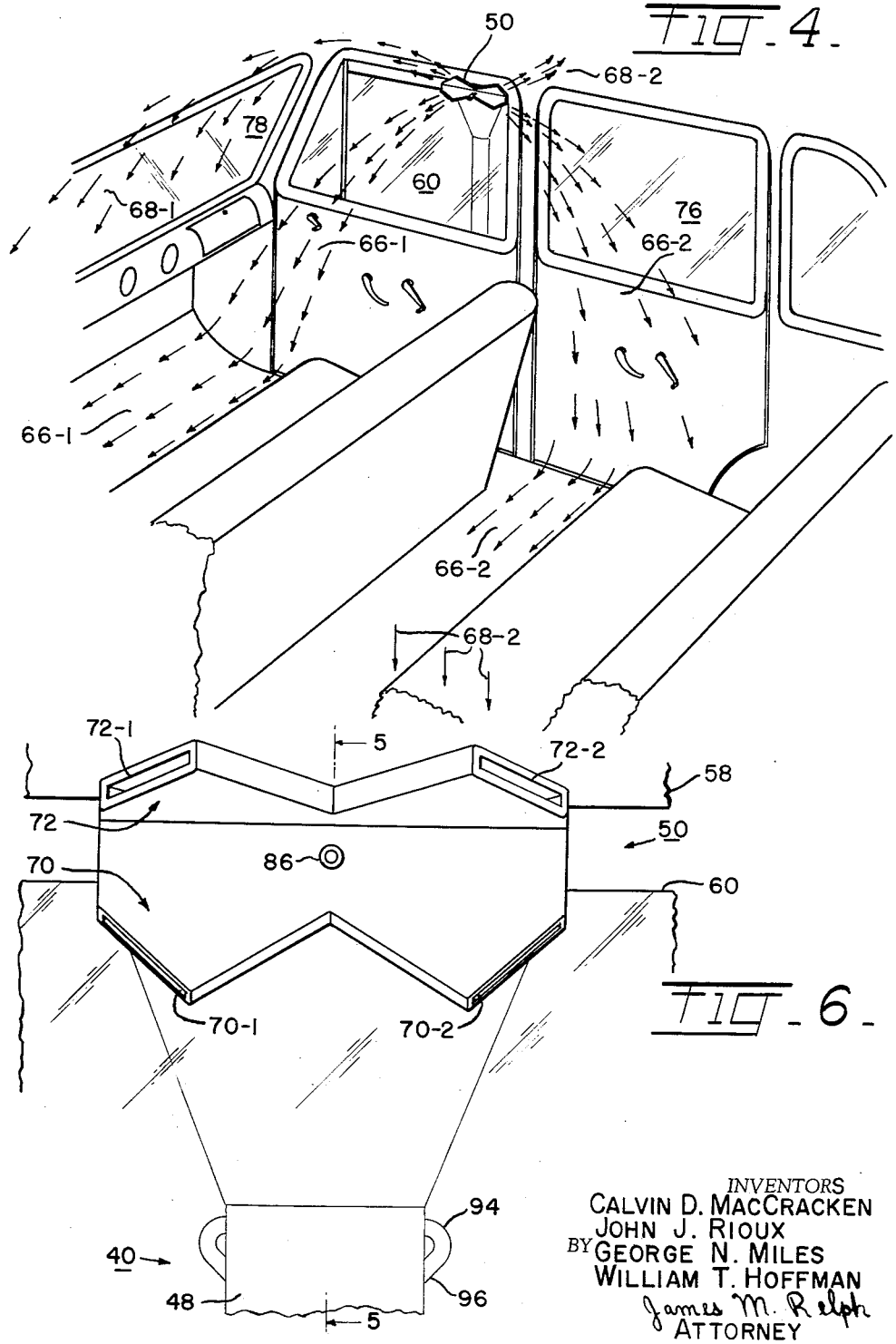

May 15, 1962    C. D. MacCRACKEN ETAL    3,034,414
METHODS AND APPARATUS FOR SUPPLYING CONDITIONED
AIR TO THE INTERIORS OF AUTOMOBILES
PARKED AT DRIVE-IN THEATERS
Filed Nov. 5, 1958    4 Sheets-Sheet 3
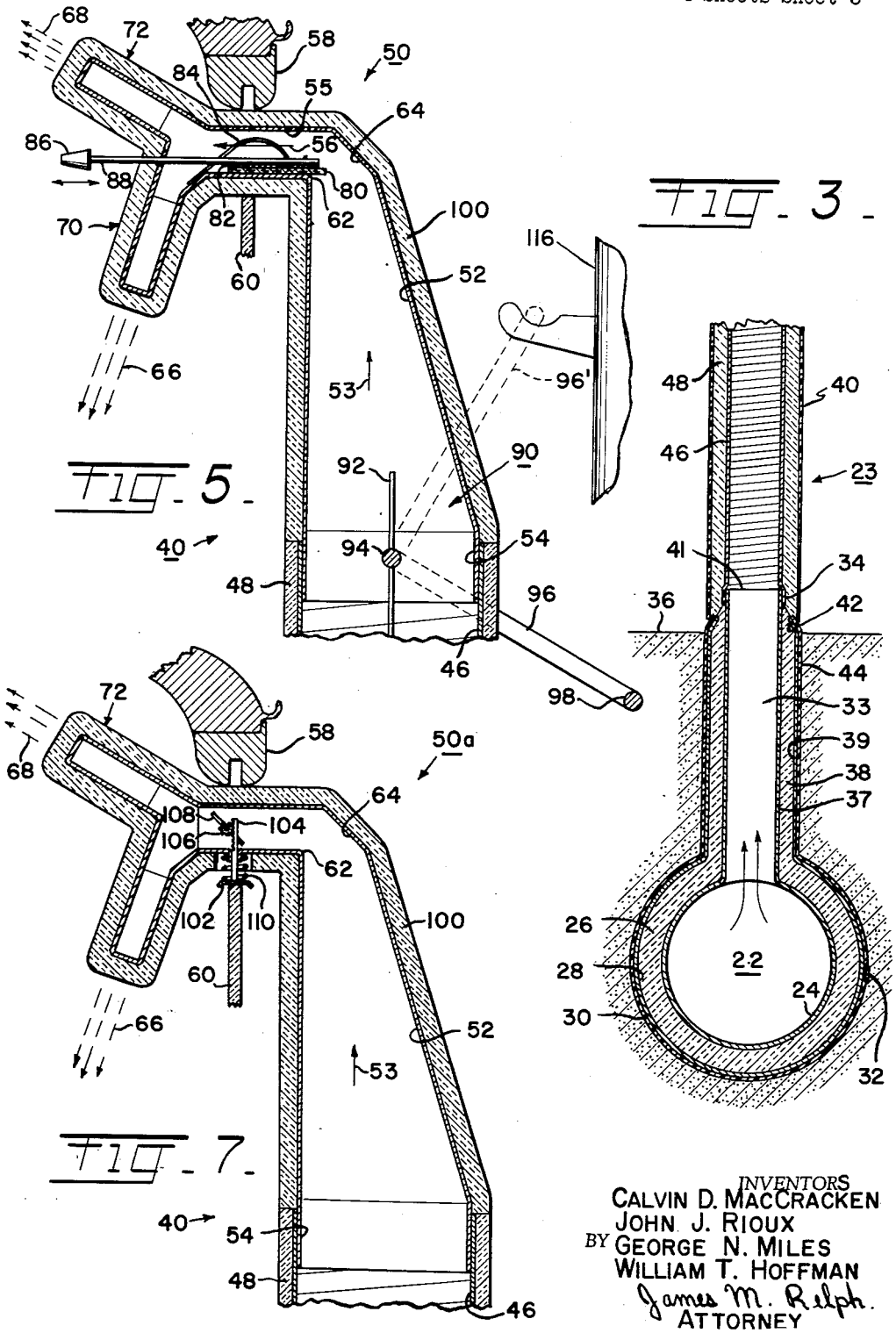
INVENTORS
CALVIN D. MacCRACKEN
JOHN J. RIOUX
GEORGE N. MILES
WILLIAM T. HOFFMAN
BY James M. Relph
ATTORNEY

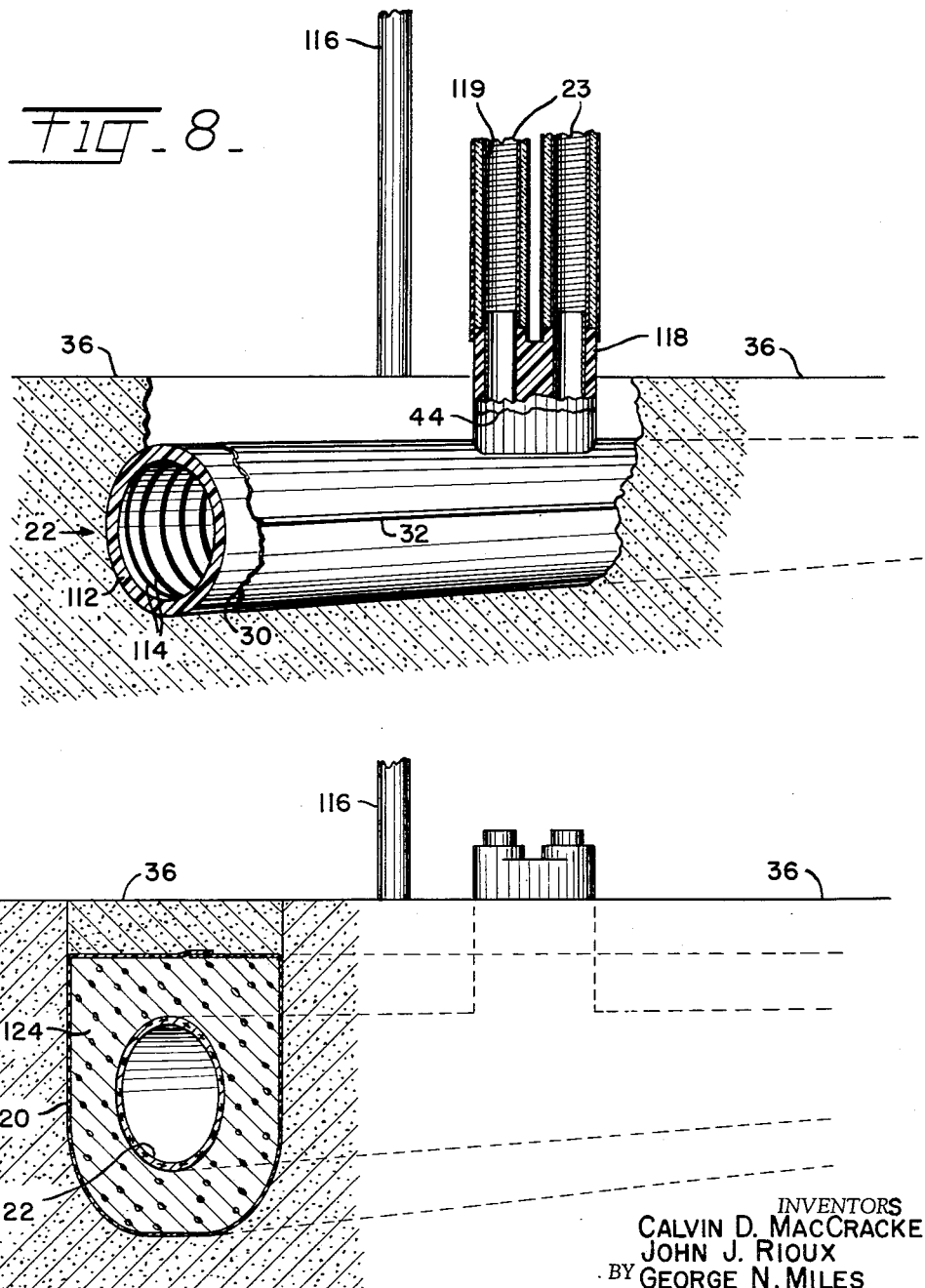

United States Patent Office 3,034,414
Patented May 15, 1962

3,034,414
METHODS AND APPARATUS FOR SUPPLYING CONDITIONED AIR TO THE INTERIORS OF AUTOMOBILES PARKED AT DRIVE-IN THEATERS
Calvin D. MacCracken, Tenafly, John J. Rioux, Woodcliff Lake, George N. Miles, Tenafly, and William T. Hoffman, Teaneck, N.J., assignors to Jet-Heet, Inc., Englewood, N.J., a corporation of New York
Filed Nov. 5, 1958, Ser. No. 772,060
7 Claims. (Cl. 98—2)

The present invention relates to methods and apparatus for supplying conditioned air to the interiors of automobiles at drive-in theaters, and more particularly to methods and apparatus conditioning and pressurizing air at a central location, conveying the pressurized-conditioned air at high velocity to a plurality of automobiles and introducing this air into the interiors of the automobiles as jet streams flowing along predetermined paths.

The illustrative embodiment of the present invention is particularly described as a centralized heating system wherein the pressurized heated air is blown into the automobiles along paths of predetermined direction extending to points within the interior of the automobile remote from the point at which the air is first introduced therein. In this example of the invention the conditioned air is blown into each automobile through an air diffuser nozzle which directs the air into a plurality of streams forming highly effective sheets of conditioned air which hug the inner surface of the passenger compartment along predetermined paths and travel to the remote areas so as to warm the feet of the persons sitting there. Uncomfortable drafts upon the person sitting nearest to the air diffuser are avoided while remote areas of the passenger compartment are maintained comfortable by the air distribution flow. The diffuser nozzle described produces a split curtain of air flowing along the roof of the car and a split air curtain flowing down along the side. The methods and apparatus described herein provide many advantages which also lend themselves to the cooling of automobiles at drive-in theaters in summertime as well as heating them in cold weather, as will be described toward the end of the specification.

Among the many advantages of the illustrative embodiment of the present invention are those resulting from the fact that the heating system is entirely safe and provides a generally uniform heating effect within the interior of the automobile so that persons who are sitting remote from the point at which the air is introduced are maintained comfortable.

In the past it has been proposed to heat automobiles at drive-in theaters by means of electric heating systems. These electric systems are expensive to install and operate and are hazardous in operation because they require a high-temperature, high-voltage heating unit which is placed within the passenger compartment together with the people, whose attention will be absorbed by the theater. In many cases children will be playing or sleeping in the automobile; so that an electric heater offers the possibility of shocking or burning the youngsters or of setting fire to clothing or upholstery. In systems utilizing electric heaters, a major proportion of the heating effect is obtained by radiation from the heater, and thus persons who are sitting in the path of radiation soon become overheated while others may be uncomfortably cold. Some patrons of drive-in theaters are in the habit of placing electric heaters down behind the front seat so as to avoid direct radiation, but this places the heater so close to the upholstery as to be dangerous and is entirely unsatisfactory when children are in the back seat.

Proposals have been made to heat automobiles at drive-in theaters by means of individual propane heaters. However, these heaters have the extreme disadvantage of introducing combustion products into the passenger compartment wherein people will be sitting relaxed for long periods of time with their attention directed to the entertainment and with the windows closed. Moreover, these units require the positioning of compressed combustible gas adjacent to the passenger compartment, and people therein are likely to be smoking. The high-temperature radiant heater also suffers from draw-backs similar to those of the electric heater, and there are problems in igniting the heater, in periodic recharging of the compressed gas cylinders and in regulating the amount of heat.

In the methods and apparatus described herein as illustrative of the present invention the air is heated and pressurized at a central location at which a suitable fuel such as oil or gas is burned under efficient and accurately controlled conditions, thus providing for fuel economy and resultant minimized costs of operation. The heated pressurized air is conducted at relatively high velocity from the central location through main supply header ducts which are buried beneath the parking area and have a relatively small diameter compared with the relatively large diameter of the ducts as required to carry the air supply in domestic heating systems operating at conventional pressure. These headers are surrounded by an insulation jacket and feed into flexible vertical distribution ducts at the respective stations having a diffuser nozzle at the upper end. By virtue of the divided curtains of conditioned air which are injected by the diffuser nozzle, the person seated closest to the nozzle is spared from drafts, and yet the air is distributed throughout the passenger compartment so as to provide uniformly good comfort conditions at each place within the car. Two diverging streams of air flow along beneath the roof. One roof stream passes down over the inside of the windshield so as to prevent fogging. The other roof stream travels across to the other side of the car and down along to the feet of the person in the back seat on that side. Also, two streams flow down along the car side.

Among the many advantages of the air diffuser nozzles disclosed herein are those resulting from the fact that they produce four divided curtains of air which are very comfortable to the occupants of the automobile and produce uniform conditions and from the fact that they automatically turn on the air flow when placed in use.

Another advantage of the air diffuser nozzles as shown is that they conveniently enable individual control of the temperature within each automobile by operation of an air flow control valve.

A further advantage of the system described herein is the elimination of window fogging so that the passengers in the automobile have a clear view of the movie screen without periodically wiping the inside of the windshield. Moreover, this system continuously introduces fresh air into the passenger compartment of the automobile. Whereas, the electric heaters and propane heaters which have been used heretofore do not introduce any fresh air.

The system of the present invention utilizes an input pressure within the range from 1.0 inch to 2.5 inches of water and utilizes header ducts which are markedly smaller in diameter than the header ducts used in domestic heating systems operating at conventional pressures. These smaller diameter ducts are suitable and economic for underground installation beneath the parking ramps of a drive-in motion picture theater.

It is an object of the present invention to provide methods and apparatus for supplying conditioned air to automobiles at drive-in theaters which are completely safe to the occupants of the automobiles and which provide uniformly good conditions of comfort throughout the passenger compartments of the automobiles.

In this specification and in the accompanying drawings, are described and shown methods and apparatus embodying the invention for advantageous use at drive-in theaters and various modifications thereof are indicated, but it is to be understood that these are not intended to be exhaustive nor limiting of the invention, but on the contrary are given for purposes of illustration in order that others skilled in the art may fully understand the invention and the manner of utilizing the methods and apparatus at drive-in theaters to maintain the passenger compartments of automobiles suitably comfortable and so that others skilled in the art will know how to adapt these methods and apparatus in various forms, each as may be best suited to the conditions of a particular theater installation.

The various objects, aspects, and advantages of the present invntion will be more fully understood from a consideration of the following specification in conjunction with the accompanying drawings, in which:

FIGURE 1 is a plan view of a portion of a drive-in theater illustrating a system for supplying conditioned air to automobiles which embodies the present invention; several main conditioning and high-velocity air-blowing units are utilized in this example, and each unit handles the air to be supplied to a relatively large number of automobiles; in this example, the conditioning units are described as forced air flow air-heating furnaces of a type described below.

FIGURE 2 is an elevational view taken along the line 2—2 of FIGURE 1 and on enlarged scale showing the arrangement of one of the main supply headers running underground from one of the main conditioning and high-velocity air-blowing units to a plurality of individual distribution ducts which extend up at each automobile station in a convenient location. As shown, the main supply header runs along an arcuate parth beneath the parking ramp approximately in line with the respective speaker stands, that is, along a line underground a short distance behind the front wheels of the automobiles, so as to be approximately beneath the front side windows;

FIGURE 3 is an enlarged elevational view and sectional view of one of the connections between the supply main and one of the distribution ducts showing the material surrounding the duct for waterproofing and thermal insulation. This view also shows the flexible distribution duct which extends to the air diffuser nozzle itself and shows the detachable connection between this flexible duct and the rigid riser section on the main supply header;

FIGURE 4 is a perspective view illustrating the air diffuser nozzle in position in the right front window of an automobile and showing the advantageous divided curtains of air along the roof and down along the side of the car;

FIGURE 5 is a side elevational sectional view of the air diffuser nozzle showing the position of the window pane when it is rolled up against the throat of the nozzle, the air flow from this diffuser nozzle is shut off when it is hung up on the stand not in use;

FIGURE 6 is a front elevational view as seen looking at FIGURE 5 from the left;

FIGURE 7 is a side elevational view similar to FIGURE 5 showing a modified air diffuser nozzle in which the air flow is turned on by the rolled-up window pane engaging the throat portion of the nozzle.

FIGURE 8 is a perspective view, on enlarged scale and shown partially broken away and partially in section, of another structure of header duct for use in the system of the present invention; and FIGURE 9 is a similar perspective view on the same scale of a further embodiment of a header duct for use in the system of the present invention.

As shown in FIGURES 1 and 2 automobiles 10 are parked in a drive-in motion picture theater area generally indicated at 11 and are arranged along arcuate rows 12, 13, 14, and 15 looking toward the projection screen 16. In order to condition the passenger compartments of the cars, several main centralized conditioning and air-blowing units 18 are utilized. In this example, these main conditioning units are described as being forced air-flow air-heating furnaces of the type disclosed in U.S. Patent No. 2,752,912 issued to Calvin D. MacCracken. Each unit 18 is mounted on a low concrete foundation 19 and is arranged with its smallest dimension extending vertically and its long dimension extending toward the screen so as to present a very low silhouette, which is beneath the view of the screen from any of the rows behind.

As will be appreciated, FIGURE 1 illustrates only a few of the front rows of the theater, and there are numerous other rows not shown which are located behind the row 15 and may, for example, have progressively greater numbers of parking stations in each row. Advantageously, with the methods and apparatus described herein, each unit 18 is enabled to supply a relatively large number of automobiles, for example, up to approximately 30 automobiles. These first few rows 12—15 happen to have no more than approximately thirty parking stations each, and accordingly a single unit 18 is positioned near the center of each row and supplies all of the parking stations in its row. The forced airflow air-heating furnace 18 as mentioned above has an output plenum chamber from which the heated air is forced into the main supply header 22 which feeds out to the distribution ducts 23 at the various parking stations. In the present system, a single large diameter coupling duct 20 feeds directly down from the furnace 18 into the center portion of a main header supply duct 22. This header supply duct is insulated and waterproofed as described further below in detail which provides easy installation and maintenance.

It will be understood that in the other longer rear rows (not shown) a plurality of the units 18 are utilized for each row, with the respective units being located at positions off from center of the individual rows, so that no more than approximately 30 parking stations are supplied by each of the units 18.

The layout of the theater is planned, as shown, with a view toward locating each unit 18 as near as possible to the geographic center of the respective stations supplied by it. During relatively mild conditions the number of stations supplied by a given unit 18 can be increased to 32 or 34 where there is convenience in increasing the number of stations which are supplied by it. Also, the theater layout takes into account the fact that in extremes of temperature conditions the number of active stations supplied by each of the units 18 may conveniently be reduced slightly so as to assure plenty of capacity for maintaining the interiors of all of the automobiles comfortable. For example, on very cold nights, when the number of patrons is likely to be below average anyway, the operator of the theater may find it convenient not to use the last two stations at both ends of the rows 12—15. Thus the units 18 each supply a reduced total of 26 stations, while still leaving a symmetrical parking pattern for good viewing of the screen 16 and for economical operation. Similarly, the layout of the rear rows takes into account the possibility of not using the last one or two stations at the ends of the respective main supply headers.

It will be appreciated that it is usually more economical from an over-all operational point of view to install a furnace 18 having a capacity for approximately thirty cars in average temperature conditions but which may contemplate not using a few stations in each row in very cold weather than it is to have a great deal of excess heating capacity which is only rarely required to be used. However, the methods and apparatus of the present invention are capable of providing excess capacity in those particular theaters in which the operators request the ability to handle full capacity crowds under all practicable weather conditions.

In operation of this system, the heated pressurized air leaves the plenum chamber of the furnace and enters the top of the coupling duct at a temperature of at least 200° F. For obtaining good operating conditions the air pressure at the top of the coupling duct 20 lies in the pressure range from 1 to 2.5 inches of water and in the temperature range from 200° F. to 350° F. Optimum operating conditions are obtained in this system with pressure in the range from 1.5 to 2.0 inches of water and temperature in the range from 250° F. to 350° F. when supplying more than a dozen automobiles from the furnace. In this example the pressure is 1.75 inches of water and the temperature is 275° F.

As shown in FIGURE 3, in this example the main supply header 22 comprises an inner pipe 24 surrounded by a thermal insulation blanket 26 and a concentric outer pipe 28, surrounded by a waterproof covering 30. In this illustrated embodiment the inner pipe 24 has a diameter in the range from 5½ to 8 inches and is formed by galvanized steel stove pipe (sometimes called furnace flue duct). The insulation blanket 26 has a thickness of the order of 2 inches, being formed by a blanket of plastic foam, or glass wool, asbestos, granulated cork, or fibrous or cellular material of a type which remains unaffected by temperatures throughout the range from 35° F. up to 350° F. Around the insulation 26 is a second pipe 28, which is shown here for example as being galvanized stove pipe having a diameter which is four inches larger than the inner pipe 24, thereby defining an annular insulation space which is two inches thick. This outer pipe 28 has a diameter in the range from 9½ to 12 inches. In this example, inner and outer pipes 24 and 26 have diameters of 6 and 10 inches, respectively, and the insulation is glass wool.

An advantage of this header 22 is its light weight and relatively great strength, which makes it easy to handle and to install in the ground. Moreover, this construction provides good thermal insulation and increases the over-all efficiency of the system. The header is buried in an arcuate trench which runs along the length of the respective parking ramp just behind the line of loudspeaker stands so as to be beneath the position of the front seats in the parked automobiles.

As shown in FIGURE 2 there are flexible distribution ducts 40 connected to the header and having air diffuser nozzles 50 on their upper ends for supplying the desired conditioned air into the passenger compartment of each automobile. In order to support these flexible ducts, they are attached to the loud speaker stands near the top. The point of attachment is sufficiently high that the diffuser nozzle 50 and the upper portion of the flexible duct will not fall to the ground but rather hang down beside the load speaker stand in a convenient position to be reached through an automobile window and lifted into place at the window.

For purposes of excluding moisture from the header 22, a waterproof covering 30 is applied before the header is lowered into position in the prepared trench. In this example the covering 30 is formed by a tubular plastic jacket of polyethylene whose edges are sealed together at 32 by means of a plastic zipper of the type having longitudinal interlocking beads. As the zipper is run along so as to lock the two edges of the jacket 30 together a self-setting cement is squirted onto the beads of the zipper before they are interlocked. After the beads of the zipper are forced together with the cement between them, a completely waterproof jacket is formed for the header 22. As shown in FIGURE 3 the zipper seam 32 extends along one side of the jacket 30 where it is conveniently reached prior to the lowering of the header into the trench. The coupling duct 20 is similarly constructed and insulated with a waterproof plastic sleeve surrounding it and joined to the waterproof jacket 30.

The lower portion of each distribution duct 23 comprises a rigid riser 33 extending straight up from the top of the header 22 to a disconnect coupling at 34 which is just above the surface level 36 of the parking station ramp. This riser 33 has a construction corresponding to that of the header 22 but is of smaller diameter.

In this example, the riser 33 comprises an inner galvanized steel stove pipe lining 37 having a diameter in the range from 1½ to 3½ inches, surrounded by an insulation blanket 38 of glass wool or asbestos having a thickness of one inch and a galvanized stove pipe covering 39 having a diameter in the range from 3½ to 5½ inches.

In order to provide a convenient tight telescoping fit with the upper flexible portion 40 of the distribution duct 23, the top end 41 of the inner pipe 37 projects up two inches above the top edge 42 of the outer pipe 39. To protect the insulation 38 and to provide a seat for receiving the flexible duct 40, the top edge 42 is rolled in all around at an angle of 30° to the vertical, thus forming a conical seat.

The waterproof plastic jacket 30 has sleeves 44 secured thereto and spaced along the length of the header 22 at positions corresponding to the positions of the respective risers 33. These sleeves surround the respective pipes 39 up to the conical seat 42 being drawn in over this conical seat to form a tight weather seal.

It is an advantage of this disconnect coupling 34 that the operator can quickly and easily lift off the ducts 40 for storage during any season when the drive-in theater is not in use. Sealing caps are readily fitted down over the seats 42, thus preventing water from entering the risers while the flexible ducts 40 are being stored.

The flexible metal core 46 has the same diameter as the liner pipe 37 and is formed by a spirally wound galvanized steel strip having a flattened S-shaped cross-sectional configuration so that the adjacent convolutions of the strip are interlocked, but free to move with respect to one another as the duct is flexed in use. This flexible core 46 is surrounded by an adherent insulation layer 48 of the kind described and claimed in the application of Calvin D. MacCracken et al., Serial No. 540,425, filed October 14, 1955, now Patent No. 2,936,792. For example, this insulation layer is a tough, highly flexible, homogeneous and resilient cellular foam plastic insulation layer having closed cells therein filled with carbon dioxide, being the reaction product of a polyurethane and a polyester containing unreacted carboxyl groups, as described and claimed in said application. This flexible duct 40 has a total length of about 6 feet extending from the disconnect coupling 34 up to its upper end, for this is found to be an adequate and convenient flexible length to reach the tops of the windows in the front doors or rear doors of all the various automobiles.

In this example, the flexible duct 40 and the riser pipe 23 each has a diameter of 2 inches, and the flexible insulation 48 is desirably ½ of an inch thick.

In order to feed the heated air into the passenger compartment so as to obtain a comfortable temperature throughout the entire interior, an air diffuser nozzle 50, as shown in FIGURES 2, 4, 5 and 6, is connected to the upper end of the flexible distribution duct 40. This nozzle as shown is drawn in exact proportion, but on a somewhat reduced scale from the actual nozzle itself, and it includes an upwardly extending tapering metal throat 52 which defines an upwardly extending throat passageway 53. A circular metal ferrule 54 projects from the circular lower end of this throat 52 and is adapted to slide snugly down into the upper end of the core 46.

Immediately above the ferrule 54, the tapering throat 52 becomes progressively smaller in depth, that is, in its front-to-back dimension, as seen in FIGURE 5, while its width progressively increases, as seen in FIGURE 6, thus maintaining a substantially constant cross-sectional area for the throat passageway 53. After the throat passageway has reduced to less than one-half of its original depth and widened out to more than twice its original width, there is an abrupt change in direction over into a horizontal throat portion 55, defining a horizontal passageway 56. This horizontal throat 55 is adapted to fit snugly beneath the window frame 58, resting on the top edge of the window 60, which is rolled up into its nearly closed position. This horizontal throat portion 55 is formed by a hollow body having a wide, low opening of a width in the range from 4 to 8 inches and a height in the range from 3/8 to 3/4 of an inch. In this example, the horizontal passageway 56 is 6 inches wide and 1/2 of an inch high, which is found to be the optimum relationship for the nozzle as shown.

In order to hang down neatly and firmly in place closely against the outside of the window, the front side of the throat 52 bends sharply at 62 forming approximately a right angle bend where it joins the horizontal throat portion 56. However, the upper portion 64 of the rear side of the throat slopes over so as to guide the incoming air smoothly from the vertical passageway 53 over into the horizontal passageway 56.

At the inner end of the horizontal passageway 56 the heated air is divided so as to form a first curtain 66 of warm air flowing down at an angle near to the vertical along closely adjacent to the side of the passenger compartment and a second curtain 68 of warm air flowing along near to the underside of the roof. Thus, advantageously, the passenger compartment is enveloped in warm air. These two curtains of air 66 and 68 are formed and directed by a lower nozzle 70 and an upper nozzle 72. Both of these nozzles are divided as explained in detail below. The lower nozzle 70 is aimed down at an angle near to the vertical in the preferred range from 0° to 30° to the vertical. In this embodiment it has been found that an angle of 15° to the vertical is optimum in producing a highly effective curtain of air 66 without creating any undesirable drafts on the person who may be sitting nearby.

The upper nozzle 72 is aimed at an angle above the horizontal, but at an angle no more than 45° above the horizontal. The preferred range of the angle for the upper nozzle 72 is between 5° and 45° above the horizontal and in most automobiles an angle of 30° above the horizontal is found to be most suitable for sending the warm air along near the underside of the roof.

It will be appreciated that these nozzles 70 and 72 create two curtains of heated air which diverge from one another at an angle of more than 90° as seen in FIGURE 5. In this particular example the angle of divergence as measured in the vertical plane is about 105°.

Directing attention to FIGURES 4 and 6, it will be noted that both the lower nozzle 70 and the upper nozzle 72 are advantageously divided into pairs of nozzle jets 70-1 and 70-2 and 72-1 and 72-2, respectively. Each of these nozzle pairs diverges at an angle of more than 90°. Moreover, the mouths of these respective jets are relatively wide and narrow. It is found preferable to have a width in the range from 1 to 3 inches for each and a height in the range from 1/4 to 1/2 of an inch. In the nozzle which is illustrated as producing optimum results in many different types of automobiles these discharge mouths have a width of 2 inches and a height of 3/8 of an inch, thus forming a sheet or curtain of air flowing along closely adjacent to the side and top of the passenger compartment.

The resulting highly desirable air curtains are illustrated in perspective in FIGURE 4. The lower curtain 66 is divided into forward and rear sheet-like streams 66-1 and 66-2. The forward curtain stream 66-1 is very effective in flowing down along the side and then curving in and along the floor so as to keep the front passengers quite comfortable. Similarly, the rear curtain stream 66-2 is very effective in flowing down closely adjacent to the side and then curving in and along the floor of the rear area. By passing the warm incoming air along the side windows 60 and 76, fogging is avoided.

In order effectively to envelope the passenger compartment in warm air without drafts on the person sitting near the diffuser nozzle 50, the upper curtain is divided into front and rear sheet-like streams 68-1 and 68-2. The front upper curtain 68-1 passes along closely beneath the roof on a diagonal and down across the windshield so as to avoid fogging. Only the beginning and ending of the path of the rear upper air curtain can be drawn in this perspective view, but the reader will appreciate that the path 68-2 begins up along beneath the roof near the doorpost or space between the windows 60 and 76 as indicated by the arrows 68-2 close to the diffuser. This sheet-like stream passes along the underside of the roof on a diagonal toward the rear and then curves down along the opposite side of the car near the rear seat, as indicated by the three arrows 68-2 which are adjacent to the nearer end of the rear seat, as seen in FIGURE 4. Thus, all of the passengers are kept fully comfortable and warm.

An important factor in the effectiveness of the present system is that the streams of air flowing intimately over the roof and wall panels control the temperature of these panels and thereby make radiation an important effect in controlling the ambient temperature in the car.

In order to control the amount of heating there is a slide valve including a felt pad 80 secured to the underside of a slide plate 82. This slide valve is held down firmly in position against the bottom surface of the horizontal throat portion 55 by spring means 84 in the form of a pair of bow springs pressing down on the slide plate. Only one of the bow springs appears in FIGURE 5. A control knob 86 is provided on the end of a slide rod 88 which projects into the passenger compartment between the nozzles and which is secured to the slide plate. The flow of air is constricted between the sloping deflector 64 and the rear edge of the felt pad 80 which projects to the rear slightly beyond the slide plate. By pushing the control knob fully in, the flow of air is cut off entirely by the resilient edge of the pad 80.

In order to shut off the air flow when the diffuser is not in use, there is a damper valve 90 including a valve disc 92 mounted on a rotatable valve shaft 94 and controlled by a movable lever arm 96. This lever arm has a hang-up loop 98 at the end which catches over a hook on the loudspeaker stand. As the nozzle 50 is hung up, its weight swings the arm 98 up to the closed position 96', thus shutting off the air flow.

A resilient insulation layer 100 approximately 1/4 of an inch thick completely surrounds the nozzle. Its resilience is desirable in protecting the window glass 60.

It is found that a pressure of about 1/2 of an inch of water in the nozzle throat along the center of the horizontal path 56 creates very effective air curtains as claimed.

This system as described supplies 100,000 B.t.u. per hour, which is 3,300 B.t.u. per hour per car for a total of 30 cars. When a few of the parking stations are closed down, as explained above, then, the amount of heating available per car is correspondingly increased.

In the modified form of nozzle 50A shown in FIGURE 7, the construction is identical except that the air flow is controlled by the top edge of the window 60 which engages beneath a saddle 102. This saddle controls a push-rod rack 104 which is in engagement with a pinion gear 106 on a pivot shaft controlling the angle of a rotatable valve plate 108. A spring 110 normally urges the rack down toward closed position.

In the foregoing example the air was described as being heated by conditioning units 18 in the form of forced air-flow air-heating furnaces. Similar and analogous advantages are obtained when cool air is being delivered. In cooling automobiles at the theater 11, there are advantages in using a high pressure, low temperature unit 18 of the kind described in U.S. application Serial No. 462,866, filed October 18, 1954, and assigned to the same assignee as the present application. For cooling, the air is supplied to the coupling duct 20 at a pressure of approximately 1.75 inches of water above atmospheric and at a temperature in the range from 35° F. to 43° F., thus providing 1,200 B.t.u. per hour of cooling per car, for a total of 30 cars. For cooling, good results are obtained with a pressure in the throat passageway 56 of about ½ of an inch of water.

The header duct shown in FIGURE 8 comprises a cylindrical wall 112 of foamed plastic material, for example foamed polyurethane. A suitable material is a tough, highly flexible, homogeneous and resilient cellular foam plastic insulation layer having numerous closed cells therein filled with carbon dioxide, being the reaction product of a polyurethane and a polyester containing unreacted carboxyl groups. A spiral spring wire 114 provides additional structural strength against crushing stresses on the duct, while allowing the duct to flex longitudinally as may be desired during installation. As shown this spiral wire 114 is wound along the inner surface of the foamed plastic wall. It is possible to wind this support wire around the outside of the wall 112; however, the arrangement as shown is preferred because a more uniform supporting action is provided for a given amount of wire material. In this illustration the inner diameter of the duct 22 is six inches, and the wall thickness is shown as two inches.

In order to make certain that ground water does not penetrate into the various cells of the foamed plastic wall 112 and reduce the effectiveness of its thermal insulation, a waterproof jacket 30 surrounds the duct. This jacket is formed by a film of polyethylene which is wrapped around the duct and has its edges heat-sealed together along a seam 32 extending along the top of the duct. Another highly effective way in which to form this waterproof jacket is to apply directly on the outer surface of the foamed plastic wall 112 a coating of a mixture of rubber and polyethylene. This mixture is available commercially from E. I. du Pont under the designation "Hypalon."

As shown in FIGURE 8, the flexible distribution duct 23 rises from the surface of the earth 36 near to the base of a loudspeaker stand 116. This distribution duct 23 is similar in construction to that of the header duct itself except that it is smaller in size. It has a foamed plastic wall 118 of a thickness of one inch and an internal spiral supporting wire 119. A waterproof sleeve 44 extends up from the jacket 30 to a point above the ground level. This duct 23 has a point of support near the top of the adjacent loudspeaker stand 116.

The inner diameter of the header duct 22 may advantageously be reduced in stages along its length in a direction away from the central unit 18. Assuming that the unit 18 is connected to the header at its center, as is shown in FIGURE 2, the central one-third of the header has an inner diameter as specified above. Then, the next sixth part of the header going toward each end has an inner diameter which is ⅔ of the central part. The outer one-sixth at each end has an inner diameter which is ½ of the central part, while the wall thickness of each stage remains the same. In installations where the unit 18 is connected to the header at one end, then the one-third of the header which is closest to this unit has the largest internal diameter, the next one-third has the intermediate size of ⅔ of this diameter, and the last third has an inner diameter which is ½ of the first section.

The header duct shown in FIGURE 9 is formed by digging a trench in the earth corresponding in width with the desired outside diameter of the header and lining the trench with a waterproofing sheet material 120 such as tarpaper or polyethylene. A fibreboard liner 122 is temporarily suspended above the bottom of the duct by means of wire supports hanging down from temporary support boards extending transversely across the top of the trench. A suitable liner 122 can be obtained commercially from the Sonoco Products Company of Hartsville, South Carolina, under the trademark "Sonoairduct." An insulating concrete 124 is poured into the waterproof material so as to surround and cover the liner 122. Then the top edges of the waterproof material 120 are drawn together over the concrete and are sealed along a longitudinal seam 32 so as to form a jacket completely around the header. When polyethylene sheet material is used the seam 32 is formed by heat sealing. A hot tarred lap joint is used for the tarpaper. A suitable lightweight aggregate concrete for this use can be obtained commercially from the Mearl Manufacturing Corporation of Roselle Park, New Jersey, under the trademark "Mearlcrete."

The lower portion of the distribution duct 23 is formed by pouring the insulating concrete around an upright fibreboard liner within a sleeve 44 of waterproofing material. Above the ground level 36, a flexible foamed plastic wall 118 and spiral spring wire 120 are used to form the flexible portion of this duct 23, as in FIGURE 8.

Although this invention is described in particular in conjunction with a drive-in theater, it is suitable for use in other drive-in applications, such as drive-in restaurants, where numerous automobiles are parked for relatively long periods of time with the passengers remaining therein.

From the foregoing it will be understood that the examples of the present invention described above are well suited to provide the advantages set forth for supplying conditioned air to the interiors of automobiles at drive-in theaters, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An air diffuser nozzle adapted for use in conditioning the passenger compartments of automobiles at drive-in theaters comprising an outer open end which opens downwardly and is adapted to be connected to an air supply duct a tapering throat extending upwardly from said open end, said tapering throat becoming progressively narrower in front-to-back dimension and progressively wider at points progressively higher along the length thereof, a wide horizontal throat connected at its outer end to the upper end of said tapering throat and having a low height adapted to fit over the top of an automobile window which is in nearly closed position, said horizontal throat being adapted to feed conditioned air into the compartment from the upper end of the tapering throat, and a plurality of nozzles connected to the inner end of said horizontal throat, one of said nozzles being aimed downwardly at an angle near to the vertical for creating a first curtain of air flowing downwardly generally along near to the inner surface of said window and the inside surface of the passenger compartment beneath said window and the other of said nozzles being aimed inwardly and upwardly for creating a second curtain of air flowing inwardly and upwardly along near to the undersurface of the roof.

2. An air diffuser nozzle adapted for use in conditioning the passenger compartments of automobiles at drive-in theaters comprising an outer open end for connection to a distribution duct, a tapering throat extending upwardly from said open end, said tapering throat progressively decreasing in front-to-back dimension while progressively increasing in width in a direction upwardly along its length, a relatively wide generally horizontal throat connected at its outer end to the upper end of said tapering throat adapted to feed conditioned air into the passenger compartment therethrough, said horizontal throat being wide horizontally and narrow vertically adapted to fit over the top edge of an automobile window which is in its nearly closed position, said nozzle having a first and a second plurality of diverging nozzles connected to the inner end of said horizontal throat, said first plurality of diverging nozzles being aimed downwardly at an angle near to the vertical for creating a first curtain of air flowing downwardly generally along near to the inner side surface of the passenger compartment, said second plurality of diverging nozzles being aimed inwardly and upwardly for creating a second curtain of air flowing inwardly and upwardly along adjacent the undersurface of the roof.

3. An air distributor nozzle adapted for use in introducing conditioned air into the passenger compartment of an automobile which is parked comprising a hollow body having a generally upright outer portion with an open lower end for connection to a distribution duct, said upright outer portion being adapted to extend upwardly closely adjacent to the outer surface of a nearly fully raised automobile window, an inwardly extending horizontal portion having its outer end connected to the upper end of said upright outer portion, said horizontal portion being adapted to extend inward over the upper edge of the nearly fully raised window, valve means in said hollow body adapted to control the flow of air through the distributor nozzle, spring means connected to said valve means for urging said valve means toward closed position, valve-actuating mechanism for opening said valve means against the force of the spring means including a saddle member below said horizontal portion of the nozzle adapted to engage said upper edge of the window for opening said valve means in response to raising of the window, and a plurality of nozzle openings connected to the inner end of said horizontal portion.

4. An air diffuser nozzle as claimed in claim 2 and including valve means in said tapering throat for shutting off the air flow therethrough, and a hang-up member connected to said valve means for shutting off the flow of air in response to the hanging-up of the nozzle.

5. An air diffuser nozzle adapted for use in conditioning the passenger compartments of automobiles at drive-in theaters comprising a relatively wide hollow body having an outer end which is adapted to be connected to an air supply duct and having a low height adapted to fit over the top of an automobile window when the window is in its nearly closed position, said hollow body defining a horizontal throat passageway adapted to feed conditioned air therethrough into the passenger compartment, and first and second pairs of nozzles communicating with the inner end of said horizontal throat, said first pair of said nozzles being aimed downwardly at an angle near to the vertical in the range from 0° to 30°, said first pair of nozzles each having mouths with widths in the range from 1 to 3 inches, the width dimension extending generally parallel with the adjacent side of the passenger compartment for creating a first curtain of air flowing downwardly generally along near to the adjacent side of the passenger compartment, and the second pair of said nozzles being aimed inwardly and upwardly at an angle in the range from 5° to 45°, said second pair of nozzles each having mouths with widths in the range from 1 to 3 inches, the width dimension extending generally parallel with the adjacent surface of the roof for creating a second curtain of air flowing inwardly and upwardly along adjacent the undersurface of the roof.

6. An air diffuser nozzle as claimed in claim 5 and wherein the mouths of said nozzles have a height within the range from ¼ to ½ of an inch.

7. An air distributor nozzle adapted for use in introducing conditioned air into the passenger compartment of an automobile which has been parked comprising a hollow body having a generally upright hollow portion adapted to extend upwardly closely adjacent to the outer surface of a nearly fully raised automobile window and an inwardly extending hollow portion adapted to fit over the upper edge of a nearly fully raised window, said upright portion and inwardly extending portion being approximately at right angles to one another, a manually operable valve in said hollow body adapted to control the flow of air inwardly through said inwardly extending portion, an upwardly movable saddle element mounted beneath said inwardly extending hollow portion for engaging the upper edge of the window when the window is nearly fully raised, linkage means connecting said saddle element to said valve, and spring means connected to said linkage means for urging said saddle element downwardly, and nozzle means connected to the inner end of said inwardly extending portion.

References Cited in the file of this patent

UNITED STATES PATENTS

| | | |
|---|---|---|
| 2,041,243 | Gottwald | May 19, 1936 |
| 2,045,826 | Benolken | June 30, 1936 |
| 2,109,071 | Mautsch | Feb. 22, 1938 |
| 2,257,221 | Bell | Sept. 30, 1941 |
| 2,355,966 | Goff | Aug. 15, 1944 |
| 2,529,425 | Sharp | Nov. 7, 1950 |
| 2,614,478 | Herman | Oct. 21, 1952 |
| 2,660,943 | Dion | Dec. 1, 1953 |
| 2,708,867 | Turner | May 24, 1955 |
| 2,709,953 | Engle | June 7, 1955 |
| 2,730,866 | Baker | Jan. 17, 1956 |
| 2,747,495 | Muller | May 29, 1956 |
| 2,753,410 | Melkon | July 3, 1956 |
| 2,757,868 | Kreuttner | Aug. 7, 1956 |
| 2,765,726 | Powers | Oct. 9, 1956 |
| 2,830,622 | Roberts | Apr. 15, 1958 |

OTHER REFERENCES

Article by C. F. Boester from Heating and Ventilating Magazine, July 1949.